United States Patent [19]
Mayworm

[11] 3,939,972
[45] Feb. 24, 1976

[54] POUCH MADE OF COEXTRUDED POLYMERS

[75] Inventor: Robert G. Mayworm, Barrington, Ill.

[73] Assignee: Tower Products, Inc., Mundelein, Ill.

[22] Filed: May 17, 1974

[21] Appl. No.: 470,966

[52] U.S. Cl. ............... 206/219; 206/245; 206/260; 229/48 T
[51] Int. Cl.² ........................................ B65D 25/08
[58] Field of Search ............... 229/55, 48 T, 56, 53; 206/219, 222, 245, 260; 150/1

[56] References Cited
UNITED STATES PATENTS

| | | | |
|---|---|---|---|
| 3,300,120 | 1/1967 | McColgan | 229/55 |
| 3,321,125 | 5/1967 | Quackenbush et al. | 229/55 |
| 3,638,784 | 2/1972 | Bodolay et al. | 229/55 X |
| 3,844,409 | 10/1974 | Bodolay et al. | 229/55 X |

FOREIGN PATENTS OR APPLICATIONS

| | | | |
|---|---|---|---|
| 940,316 | 10/1963 | United Kingdom | 229/48 T |

Primary Examiner—William T. Dixson, Jr.
Assistant Examiner—Stephen P. Garbe
Attorney, Agent, or Firm—Gary, Juettner, Pigott & Cullinan

[57] ABSTRACT

A pouch is formed from a section of coextruded polymer tubing, which is pressed flat, folded over along a longitudial axis, and heat sealed along the sides, whereby the opposed walls of the pouch are each composed of two thicknesses of the coextruded material.

The outermost laminate of the coextruded tubing that form the innermost and outermost surfaces of the pouch walls is composed of a polymer, such as low density polyethylene, which can be rapidly and reliably heat sealed in the formation of the pouch, with the outermost surface being suitable for printing. The inner laminate, which is encapsulated by the outer laminate, is composed of one of a group of polymers which have relatively poor heat sealing properties but otherwise provide toughness, puncture resistance, gas and vapor barrier properties or coloration to the pouch, such as polyamides, ionomers, pigmented polyolefins and medium and high density polyethylenes.

7 Claims, 7 Drawing Figures

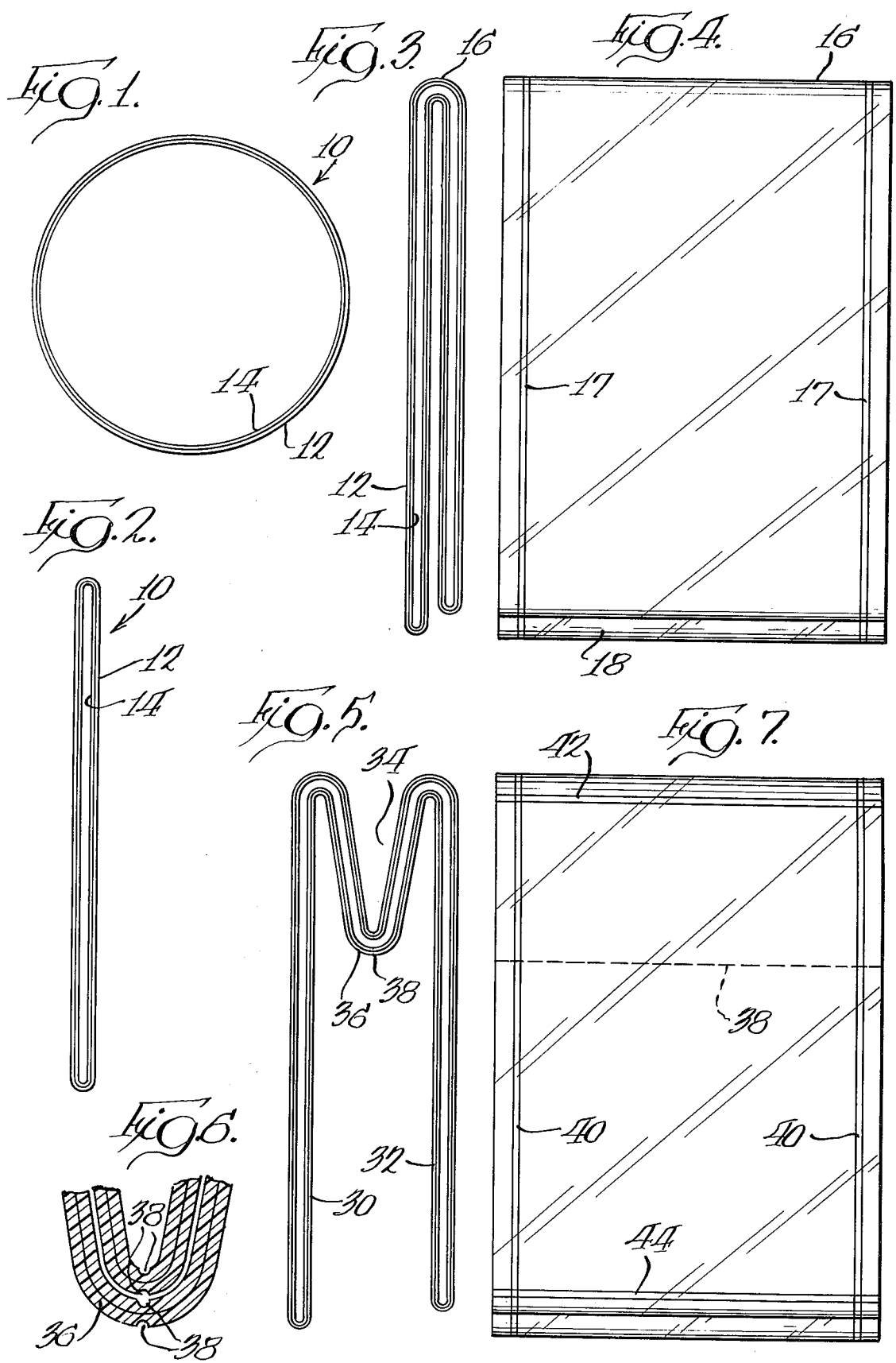

POUCH MADE OF COEXTRUDED POLYMERS

BACKGROUND OF THE INVENTION

Pouches or bags made from polymeric films have found widespread use in a variety of applications. The film is formed by hot extrusion of resin, such as blow-extrusion of a tube, and the tube is slit longitudinally along one side, cut into sections and folded into the desired shape. The unattached free edges are then bonded together, usually by heat sealing, wherein contiguous surfaces of the material are bonded together with the application of heat and pressure.

In a typical heat sealing process, facing surfaces of the film material are pressed together and heated, which causes the material to fuse together and form an autoadhesive bond. The strength of the seal obtained is a function of several factors, including the nature of the materials employed, the temperature and pressure at the material interface, the thickness of the material, and the dwell time, or the period of time during which the assembled materials are exposed to the elevated temperatures and pressures. It is known that films of low density homo and copolymers of ethylene are easily handled, and form reliable high strength welds at relatively low temperatures in excess of 250° F and at very short dwell times, usually in a fraction of a second. The ability to obtain a reliable high strength seal is extremely important to assure maximum utilization of high speed, automated processing equipment that is currently available.

Other materials, while having highly desirable characteristics, are not sufficiently autoadhesive to form reliable heat seals within a reasonable time or otherwise have undesirable surface properties for a particular application. For example, ionomer films provide excellent puncture resistance but are not easily heat sealed with conventional equipment and do not provide a surface which is receptive to printing. Pigmented polyethylene films provide opacity and desirable coloration, but the pigments therein interfere with the formation of a reliable heat seal. Polyamide films and high density polyethylene are also difficult to heat seal under normal conditions but have excellent strength properties.

SUMMARY OF THE INVENTION

In accordance with the present invention, low density homo- or copolymers of polyethylene are coextruded with a second polymer having high strength or other desirable properties, in the form of a continuous blow-extruded tube. The outermost laminate consists of the low density polyethylene material, whereas the inner laminate is composed of a second polymer having desirable properties but undesirable heat sealing characteristics.

The tube is pressed flat to form a web having two thicknesses of the coextruded material, cut transversely into sections, and is folded over along a longitudinal centerline between the severed ends. The material as assembled is then heat sealed adjacent both severed edges to form a double wall pouch open at one end. The low density polyethylene on the outside of the walls of the pouch facilitates rapid heat sealing and serves to encapsulate the interior laminate, said interior laminate serving to provide additional desirable qualities to the pouch.

THE DRAWINGS

FIG. 1 is a transverse sectional view of a coextruded tube employed in the practice of the presently described invention;

FIGS. 2 and 3 are sectional views illustrating the formation of the FIG. 1 tube into a double wall pouch;

FIG. 4 is a plan view of the completed pouch;

FIG. 5 is a sectional view of another embodiment of the double wall pouch, shown during the assembly thereof;

FIG. 6 is an enlarged detail of the structure shown in FIG. 5; and

FIG. 7 is a plan view of the completed pouch formed from the structure shown in FIG. 5.

DESCRIPTION OF THE PREFERRED EMBODIMENTS

FIGS. 1 through 4 show successive steps in the formation of the pouch of the present invention. The continuous extruded tube 10 shown in axial section in FIG. 1 is fabricated by conventional coextrusion wherein molten resin is fed via a screw conveyor under pressure through concentric lips of respective annular dies to form separate concentric films which merge and bond together to form a composite structure comprising an outer laminate 12 and an inner laminate 14 which are bonded together at the interface. The equipment employed is conventional and need not be described in greater detail.

The material in the outer laminate 12 is preferably one having good heat sealing properties. Polymers which are suitable for this purpose are low density homopolymers of ethylene, ethylene copolymers, particularly ethylene vinyl acetate copolymers, and polyethylene which has been modified with polyisobutylene, as described in U.S. Pat. No. 2,912,410. All of these materials have excellent, short dwell, heat sealing characteristics and provide a film surface that is very receptive to printing in comparison with other polymers. The term "low density polyethylene" as used herein means polyethylene having a specific gravity of about 0.910 to about 0.925, which melts in the range of about 212° to about 240°F, as fully described in U.S. Pat. No. 2,153,553. The terms "medium density" and "high density" polyethylene means polyethylene having a specific gravity in excess of 0.925 and higher melting range and less side chain branching than the low density variety, as described in U.S. Pat. No. 2,816,883.

The material of the interior laminate 14 may generally comprise any polymer having a higher softening fusion temperature than the outer laminate 12 and is selected on the basis of the properties desired in the final product, irrespective of the autoadhesiveness or the ability of the material to form heat seals, provided that the material can be coextruded with the material of the outer laminate. The term "fusion temperature" as used herein means the temperature at which the walls of the material will bond together under pressure.

The preferred materials for the inner laminate are polyamides, ionomers, pigmented polyethylene, and medium and high density polyethylene, which are capable of being coextruded with the material of the outer laminate. Ionomers and polyamides have excellent strength characteristics and are especially suitable for pouches which contain sharp objects. None of the materials used for the inner laminate would be suitable as materials for the outer laminate, due to the difficulties in obtaining a high strength seal through multiple thicknesses of material.

As shown in FIG. 2, the coextruded tube is collapsed or pressed flat to form a continuous web and is then folded over medially, as shown in FIG. 3, along a line parallel to the sides to form a structure having a pair of overlapping or superimposed double-ply walls. It will be noted that the inner laminate 14 is encapsulated by the outer laminate 12, and the facing surfaces of the respective walls are composed of the heat sealable material.

The overfolded structure of FIG. 3 is then cut into sections along lines perpendicular to the sides to form the rectangular pouch structure shown in FIG. 4. The structure is then heat sealed along parallel lines 16 closely adjacent to the severed edges to form a pouch comprising a fold 16 of double thickness material at one end and an opening 18 at the other end. The opening 18 can be sealed with conventional heat sealing equipment after the desired contents have been inserted.

In the normal heat sealing process, the edges of the folded web are pressed between heated dies for a sufficient time to fuse the facing surfaces of the walls. It will be noted that since the seal is being made through four thicknesses of coextruded material, the provision of an easily heat sealable material at the interface is highly critical to successful manufacture of the pouch. Normally, the penetration of heat by conduction into the plies will be greater at the interface of the inner laminae than at the center interface, such that the heat employed will be sufficient to form a reasonably good bond between the inner laminae, while assuring a strong bond at the interface of the outer laminae.

The double wall pouch of the present invention is particularly useful under conditions where high strengh or puncture resistance is required. For example, the pouch can be used to contain so-called "cold pack" materials comprising an inner bag of water and free ammonium nitrate granules. To activate the cold-producing reaction, the bag is squeezed to break the internal water bag, allowing endothermic mixing of the liquid and solid contents.

FIGS. 5 through 7 illustrate a second embodiment of a pouch made from overfolded tubular sections of coextruded material. The pouch walls 30 and 32 are superimposed as in the previous embodiment, and the overfolded edge is tucked in between the walls to define a separate end compartment 34 in the pouch body. The end compartment 34 terminates in a fold 36 which may contain lines of weakness 38 in each of the plies of material, as illustrated in detail in FIG. 6, in order to facilitate the later rupturing along said lines by imposing external manual pressure on the pouch walls.

The lines of weakness 38 may be provided in the pouch wall during extrusion of the material by positioning a pair of oppositely disposed probes in the path of the extruded material as it issues from the die, as fully described in U.S. Pat. No. 3,186,628. The tube is pressed flat such that the lines on opposite sides coincide and are positioned along the longitudinal centerline of the double ply web. The web is then folded in the manner shown in FIG. 5, such that the superimposed lines of weakness 38 are in the interior fold 36. The resulting structure is then heat sealed near its edges along lines 40 as shown in FIG. 7.

The resulting pouch can be used to supply two separate components, with or without internal mixing. For example, the end compartment may be filled with liquid and sealed at the end at 42, and the main cavity of the pouch may contain ammonium nitrate granules and be sealed at 44 to provide a cold pack.

Various modifications can be made to illustrate pouch structures within the scope of the invention. For example, the coextruded material may comprise three or more laminates instead of the two described. Any type of polymer may be used for the inner laminate, to the extent permitted by the coextrusion process, provided only that the outer laminate is composed of a material that is heat sealed.

What is claimed is:

1. A pouch comprising a single tubular section of coextruded laminated film having free edges at opposite ends said tubular section comprising an inner laminate and an outer laminate surrounding the inner laminate said section being flattened and overfolded medially along a line perpendicular to said free edges and defining a closed end in said pouch and a pair of superimposed walls each having two layers of said film, and means securing said walls together adjacent facing edges, said outer laminate constituting the innermost and outermost surface of each of said walls, the outer laminate being a heat sealable polymer selected from the group consisting of low density ethylene homo- and copolymers, polyisobutylene modified polyethylene and mixtures thereof, said inner laminate being a polymer selected from the group consisting of ionomers, polyamides, pigmented polyethylene, medium and high density polyethylene.

2. The pouch of claim 1 wherein a separate end compartment is provided in the folded end of said pouch, said compartment comprising a portion of said pouch which is tucked in between the walls thereof.

3. The pouch of claim 2 wherein said end compartment is provided with a rupturable area communicating with the interior of the pouch, said rupturable area comprising an area that is thinner than the surrounding portion of said end compartment.

4. A pouch comprising a single tubular section of laminated polymeric film, said tubular section consisting essentially of an outer laminate and an inner laminate, said section being flattened and overfolded medially and defining a closed end in said pouch and a pair of superimposed walls each having two layers of said film, and means securing said walls together adjacent facing edges thereof, said outer laminate constituting the innermost and outermost surface of each of said walls.

5. The pouch of claim 4 wherein said tubular section is composed of coextruded material said outer laminate being a heat sealable polymer selected from the group consisting of low density polyethylene, low density ethylene vinyl acetate copolymer, and low density polyethylene containing polyisobutylene.

6. The pouch of claim 4 wherein said pouch has an end compartment defined by a portion of said double-ply walls which is tucked in between said walls.

7. The pouch of claim 4 wherein said inner laminate is composed of a polymer material which has a higher fusion temperature than the material of the outer laminate.

* * * * *